No. 610,527. Patented Sept. 13, 1898.
F. FISCHER.
FILTER.
(Application filed Dec. 6, 1897.)
(No Model.)
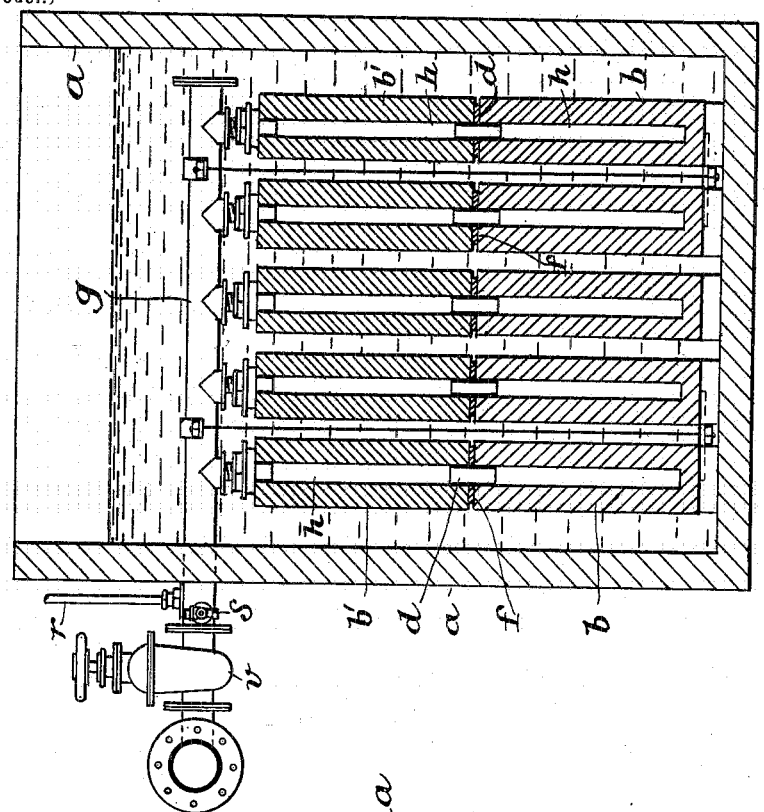
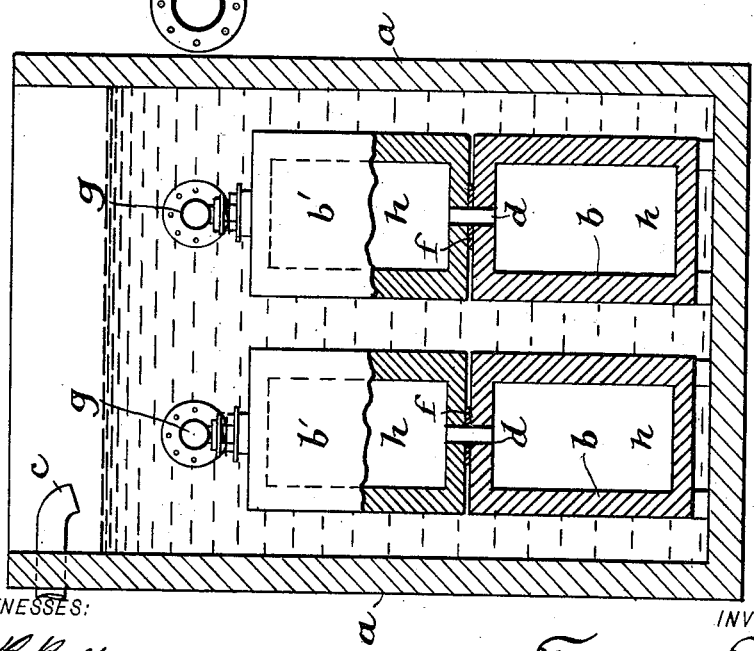
WITNESSES:
INVENTOR
Friedrich Fischer
BY Richards
ATTORNEYS

UNITED STATES PATENT OFFICE.

FRIEDRICH FISCHER, OF WORMS, GERMANY.

FILTER.

SPECIFICATION forming part of Letters Patent No. 610,527, dated September 13, 1898.

Application filed December 6, 1897. Serial No. 660,936. (No model.) Patented in England August 31, 1895, No. 16,321; in Hungary February 29, 1896, No. 5,642, and in Austria March 28, 1896, No. 46/1,236.

*To all whom it may concern:*

Be it known that I, FRIEDRICH FISCHER, a subject of the German Emperor, and a resident of Worms, in the German Empire, have invented certain new and useful Improvements in or Connected with Filters, of which the following is a specification.

This invention has been patented in England under date of August 31, 1895, No. 16,321; in Austria under date of March 28, 1896, No. 46/1,236, and in Hungary under date of February 29, 1896, No. 5,642.

Hollow filter-bodies of filters hitherto used for filtering liquids have been mostly made in this way: Two filtering-plates have been joined together, and between them a suitable "insertion" has been used to make a tight joint. This mode of making the hollow filter-bodies is, however, ineffective, inasmuch as it has not been possible to make the insertion-joint sufficiently good as to stand and suit the conditions under which filters of this type are worked and, moreover, too much time is required in joining the several plates forming one filtering-body together. According to this invention the hollow filtering-bodies are each manufactured in a single piece, and it is found to be very advantageous to do so instead of joining them together out of several pieces.

The hollow filtering-bodies are made as follows: A mixture of washed sharp sand and powdered glass, which materials, according to the purposes of the filtering parts, will be used in the proportion of one to one to three to two, is placed in a chamber of a suitable furnace, in a dry or moistened state, in a suitable mold of "Chamotte" stone, in a horizontal or vertical position, and in this chamber-furnace the filtering part or element is subjected to and burned at a high temperature. The hollow space in the filtering part or element is either formed by means of a combustible core or some mixture or material that does not coalesce or cake by burning, but can be readily removed after cooling. The filtering-bodies prepared in this manner are then tested with regard to their resistance as well as their capacity as regards quantity and quality of work.

This invention has also reference to a special mode of construction of the filter, in which the filtering-bodies, as above described, are advantageously employed for the filtration of water.

Referring to the drawings, which illustrate this invention, Figure 1 shows such an apparatus in longitudinal section, and Fig. 2 shows a cross-section through the apparatus.

Referring to the drawings, hollow filtering-bodies $b$ are placed in a vessel $a$, into which the liquid to be filtered is introduced through a pipe $c$. The filtering-bodies are so arranged that they are placed in pairs vertically, one above the other, their inner spaces or chambers $h$ being connected with each other by pipes $d$. The liquid enters from the outside through the walls $b'$ of the filtering parts into the chambers $h$ and in so doing deposits its impurities in the pores of the walls. Thence the purified liquid is carried, by means of the pipe $g$, which connects all the upper plates, into a reservoir, or direct to the place of use through the cock $s$. The pipe $g$, (which collects all the filtering liquid,) moreover, has for its object, being fixed at the highest point of the filtering elements, of carrying off air eliminated by the filtration together with the filtered liquid. In the cock or valve $s$ there is a metal plate with an opening which when the level of the water in the vessel $a$ is kept constant allows a uniform quantity of water of a certain ratio to the filtering-surface of the elements to pass through, whereby the quality of the filtered liquid is considerably improved from a bacteriological point of view.

On the pipe $g$ there is a glass tube $r$, acting as a water-level gage, in which the water communicates with that in the vessel $a$, so long as the capacity of the filter exceeds the quantity of water which can flow out through the adjusted opening in the cock or valve $s$. As soon as the level in the water-gage is lower than the level in the vessel $a$ the capacity of working of the filtering-bodies is shown to have been reduced. The impurities which have settled in the pores of the filtering-bodies are thereupon removed by an opposite or backward flow of water through them through closing the valve $s$ and opening slide-valve $v$, which is connected with the pure-water service, so that pure water is forced through the apparatus under pressure in the opposite direction to that of filtration, the water thus passing through pipe $g$ into the cavities $h$, and from there through the wall $b$ of the bodies into the vessel $a$, whereby the dirt in the pores and on the outside walls of the filter-body is detached.

In the arrangement described the filtering-bodies are connected in pairs placed vertically one above the other for the purpose of saving space; but in the same manner one or more of such bodies above one another may be arranged, accordingly as is required by the extent of the installation and the space at disposal.

Between the filtering-bodies placed one above the other an india-rubber ring $f$ is placed round the tube $d$, which ring is compressed by the weight of the upper body and therefore serves to render the connection by the tube $d$ tight and impermeable. The lower filtering-bodies should be arranged on bricks so as to prevent their coming into direct contact with the base of the vessel and the mud.

In the arrangement described the liquid to be filtered was brought into the vessel $a$ and thence into the cavities of the filtering-bodies; but the arrangement may also be made in such a manner that the liquid to be filtered is brought through the pipe into the interior of the cavities, and thence through the walls into vessel $a$, whence the filtered liquid is then removed.

The filter therein described comprising the filtering-bodies made of sand and glass and burned, form, together with the collecting-tubes for carrying off the filtered liquid and their special connections with the bodies, a complete apparatus. The body in itself, unconnected with the pipes, would not be so serviceable as a filter for working on a large scale if it were not for the fact that by connecting it with the pipes as described it is rendered possible of being cleaned by driving the water in the opposite direction to that of the water in being filtered. This backward cleansing or rinsing, which has hitherto been incapable of being efficiently performed on a large scale on account of all attempts having proved abortive, owing to the low power of resistance of the filtering material, is rendered possible by reason of the filtering material now employed, which is able to stand the greatest pressure desired.

Having now particularly described and ascertained the nature of this invention and in what manner the same is to be performed, I declare that what I claim is—

The herein-described filter comprising the outer receptacle, a water-supply therefor, an exit-pipe, and a series of filtering-bodies connected therewith, each of said bodies consisting of a plurality of porous bodies connected by a pipe and packing interposed between the adjoining ends of said bodies, substantially as described.

In witness whereof I have hereunto set my hand in presence of two witnesses.

FRIEDRICH FISCHER.

Witnesses:
 GEORG BRÜCHER,
 EUGEN SPUTH.